United States Patent
Trauger et al.

(10) Patent No.: US 9,676,013 B2
(45) Date of Patent: Jun. 13, 2017

(54) DISPERSIBLE, REACTIVE CONTAMINANT CAPPING MATERIAL

(71) Applicant: AMCOL INTERNATIONAL CORPORATION, Hoffman Estates, IL (US)

(72) Inventors: Robert J. Trauger, Cary, IL (US); Zhen Wang, Lake Zurich, IL (US); James T. Olsta, Bartlett, IL (US)

(73) Assignee: AMCOL INTERNATIONAL CORPORATION, Hoffman Estates, IL (US)

( * ) Notice: Subject to any disclaimer, the term of this patent is extended or adjusted under 35 U.S.C. 154(b) by 97 days.

(21) Appl. No.: 14/222,146

(22) Filed: Mar. 21, 2014

(65) Prior Publication Data
US 2015/0266069 A1 Sep. 24, 2015

(51) Int. Cl.

| | |
|---|---|
| B09C 1/00 | (2006.01) |
| B09C 1/08 | (2006.01) |
| B01J 20/04 | (2006.01) |
| B01J 20/06 | (2006.01) |
| B01J 20/08 | (2006.01) |
| B01J 20/20 | (2006.01) |
| B01J 20/22 | (2006.01) |
| B01J 20/30 | (2006.01) |
| E02D 15/10 | (2006.01) |
| B01J 20/28 | (2006.01) |
| B30B 11/00 | (2006.01) |
| C09K 8/52 | (2006.01) |
| E02B 3/12 | (2006.01) |

(52) U.S. Cl.
CPC ............... B09C 1/08 (2013.01); B01J 20/041 (2013.01); B01J 20/045 (2013.01); B01J 20/048 (2013.01); B01J 20/06 (2013.01); B01J 20/08 (2013.01); B01J 20/20 (2013.01); B01J 20/22 (2013.01); B01J 20/28004 (2013.01); B01J 20/28019 (2013.01); B01J 20/305 (2013.01); B01J 20/3035 (2013.01); B09C 1/00 (2013.01); B30B 11/00 (2013.01); C09K 8/52 (2013.01); E02D 15/10 (2013.01); B01J 2220/46 (2013.01); B01J 2220/4875 (2013.01); B09C 2101/00 (2013.01); C02F 2305/14 (2013.01); E02B 3/128 (2013.01)

(58) Field of Classification Search
CPC ......... B09B 1/008; E02D 15/10; E02D 3/128; B09C 1/00; B09C 1/08
See application file for complete search history.

(56) References Cited

U.S. PATENT DOCUMENTS

| | | | | |
|---|---|---|---|---|
| 4,032,476 | A * | 6/1977 | Murty | C01B 31/14 264/29.1 |
| 5,857,810 | A * | 1/1999 | Cantrell | B09C 1/00 405/129.35 |
| 5,897,946 | A * | 4/1999 | Nachtman | E02B 3/12 405/17 |
| 6,093,236 | A * | 7/2000 | Klabunde | B01D 53/02 423/604 |
| 6,403,364 | B1 * | 6/2002 | Hince | B09C 1/10 210/610 |
| 7,824,129 | B2 * | 11/2010 | Ghosh | B01J 20/12 405/128.1 |
| 8,519,061 | B2 * | 8/2013 | Luster-Teasley | B09C 1/08 210/757 |
| 2009/0099294 | A1 | 4/2009 | SenGupta et al. | |
| 2010/0222481 | A1 * | 9/2010 | Jersak | B09C 1/08 524/413 |
| 2012/0121334 | A1 * | 5/2012 | Hornaday | B09C 1/08 405/17 |

FOREIGN PATENT DOCUMENTS

GB 1217267 * 12/1970
WO WO-2008070293 A2 6/2008

OTHER PUBLICATIONS https://www.mountainproject.com/v/examples-of-general-rock-strength-by-area/108744605, accessed on Feb. 5, 2016.*
Extended Search Report for European Application No. 15159884.4 dated Aug. 28, 2015.

* cited by examiner

Primary Examiner — John Kreck
(74) Attorney, Agent, or Firm — Squire Patton Boggs (US) LLP

(57) ABSTRACT

A sub-aqueous capping material comprising a plurality of compacted particles of a reactive solid material having a dispersion aid homogeneously blended therein, the compacted particles having a specific gravity greater than 1.0, a particle size in the range of about 1/16 inch to about 1 inch, and having a time for disintegration, once in contact with water, of 5 hours or less.

15 Claims, No Drawings

DISPERSIBLE, REACTIVE CONTAMINANT CAPPING MATERIAL

FIELD OF THE INVENTION

It has been found that reactive contaminant capping materials can be compacted, together with a dispersing aid, and easily dropped through water to form a capping layer over contaminant-laden sub-aqueous soils and/or sediment in canals, rivers, bays, harbors and lakes to form a fast-reacting, dispersed layer, thereby controlling contaminant migration. The preferred reactive contaminant capping materials are selected from organoclay; activated carbon; coke; organic-rich topsoil; organic-rich sediment; humus; apatite; zeolite; iron ore-rich material; organic shale; lime; gypsum; elemental sulfur; bauxite; fish meal; zero-valent iron (ZVI) and/or oxides or hydroxyoxides of iron, manganese and/or aluminum, and mixtures or multiple layers of any two or more of the foregoing.

The dispersing aid is preferably a water-soluble dispersing agent such as acrylic copolymers; biopolymers such as guar gum, xanthan gum, welan gum, cellulose, polysaccharides, starch, lactic acid polyesters, citric acid/sodium bicarbonate, soy protein and the like, and combinations thereof, or any dispersant that will provide for the de-compaction or de-aggregation of the compacted particles when submerged in water. Other suitable water-soluble dispersing agents include lignosulfonate, amines, and water-soluble acrylates, polyvinyl alcohol, and polyethylene glycol. Preferably the dispersing agent is a biopolymer, such as guar gum and/or xanthan gum, in an amount of about 0.5 wt. % to about 2 wt. %, based on the dry weight of the compacted particles.

BACKGROUND

Sediments occurring in many of the world's aquatic environments, including harbors and shipyard areas, are impacted by a variety of organic and/or heavy metal contaminants. Organic contaminants can include TBT, dioxins, PCBs, PAHs and/or other petroleum products whereas heavy metals can include Pb, Cu, Cr, Cd, Hg and others. In many locations, concentrations of one or more of these sediment contaminants can pose unacceptable health risks to humans and/or ecological receptors. The most direct approach for effectively lowering these risks to acceptable levels is to remediate the offending sediment contaminants.

A variety of in place (in situ) and remote (ex situ) methods exist for remediating (managing) contaminated sediments, including removal, treatment, capping and natural recovery. The most appropriate method(s) for use at a given site will vary, depending on site and sediment conditions, remediation goals, costs and other factors.

In situ approaches for managing contaminated sediments and the risks they pose—in situ capping and in situ treatment, in particular—are rapidly gaining national and international favor. Increased positive recognition of in situ capping and treatment is likely due to the advantages of these two approaches (relatively lower cost, lower environmental impact during implementation and ability to rapidly and significantly reduce risks), in combination with the recognized drawbacks to other management approaches (e.g. high costs associated with removal, dredging residuals, and slow rates associated with natural recovery).

In situ capping involves covering contaminated sediment in place with one or more clean materials. In situ capping is typically conducted for the purpose of providing a barrier between sediment-borne contaminants and potential ecological and/or human receptors occurring in the overlying aquatic ecosystem, including benthic organisms living in bottom substrates. Materials used to cap contaminated sediments can be either inert or chemically/biologically reactive in character, and often comprise earthen materials, engineered materials or combinations thereof. Cap designs can range from relatively simple (e.g. a "monolayer" of a single material, like natural, quartz-rich sand) to relatively complex (e.g. a "composite cap" comprised of multiple materials used in various configurations). The barrier formed by the cap can intentionally be relatively permeable or impermeable in character, depending on attributes of materials included in the design. Furthermore, the contaminated sediment to be capped may comprise naturally deposited sediment, dredged sediment re-deposited in a new underwater location or combinations thereof.

In situ treatment involves physically incorporating one or more reactive materials directly into the contaminated sediment mass for the purpose of stimulating or enhancing biological and/or chemical processes that bring about an in-place reduction in contaminant mass; toxicity, solubility and/or mobility.

Active sediment capping involves covering contaminated sediment with chemically and/or biologically reactive material for the purpose of treating sediment-borne contaminants. Like in situ treatment, contaminant treatment within the context of active capping generally involves bringing about a reduction in contaminant mass, toxicity, solubility and/or mobility. However, unlike in situ treatment, the "zone of treatment" for active capping occurs within the capping layer itself rather than within the underlying sediment mass. That is, in order for active capping layers to be effective, sediment-borne contaminants must first migrate up into the active capping layer, in one or more forms (i.e. dissolved phases and/or particle-bound phases). Little to no "passive" contaminant treatment is typically expected to occur within the sediment mass beneath active caps.

The specific process or processes by which contaminant treatment occurs through active capping (e.g. biodegradation, decreased solubility due to increased contaminant sorption or exchange to reactive organic or mineral solid phases, and the like) depends on the type of reactive material included as well as the mobilized contaminant(s) targeted for treatment.

SUMMARY

The capping materials useful in accordance with the compositions, methods of manufacture, and methods of use described herein are compacted from finer solid materials, and may be compacted from a single reactive solid material, or from two or more reactive solid materials. In accordance with an important feature, the compacted solids have a specific gravity greater than 1.0, preferably greater than about 1.5, for fast, accurate placement through any given water depth, and include at least one dispersant so that the solids will de-compact or de-aggregate within a relatively short time span when submerged in water, over the contaminated sediment or contaminated waterway floor. The solids being compacted can be of any size, preferably having a particle size in the range of about 0.1 mm to about 2 mm, and are compacted, together with a dispersing agent, to a size of about 1/16 inch to about 1 inch in their final form. Preferably, the compacted particles are spherical in shape for vertical descent through water for accurate placement over a contaminated waterway floor.

The reactive material collectively comprises one or more minerals, naturally occurring materials, and/or processed materials, that are each chemically and/or biologically reactive. The reactive material can occur in both solid and liquid form, with solid minerals or materials occurring in a range of size fractions and/or particle densities. The primary function of the reactive material is to render the product, once placed, "active" and thus appropriate for use as an active capping material that reduces or eliminates migration of contaminants from under the capping layer(s).

DETAILED DESCRIPTION

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

There exists a need to create an appropriate balance between adequate strength and integrity of the dry, compressed particles—during their bulk handling and placement through the water column—and the requirement for particle disaggregation and infilling of macroscopic pore space, once the layer of particles is deposited across the contaminant surface. Key variables to consider towards achieving this balance include, but may not be limited to: material composition; the manufacture procedure, particularly compaction pressure; and site conditions, namely water depth and current flow.

In accordance with an important feature of the compositions and methods described herein, it is important that the reactive materials are homogeneously mixed with one or more dispersing agents prior to compaction so that the reactive materials descend through the water to the contaminant site without significant deaggregation, and then de-aggregate into smaller particles such that at least 50% of the particles disintegrate to their pre-compacted size within about 5 hours or less after placement. Since the compacted particles contain no inert solids, other than the insoluble shell from the humic acid-containing solid material that is compressed, the concentration of active (reactive) material is maximized so that a relatively thin layer, e.g., a monolayer, of reactive solids over the contaminated soil will provide an excellent and long lasting cap, thereby preventing the migration of contaminants through the capping layer. The reactive solid material may be an organoclay; activated carbon; coke; organic-rich topsoil; organic-rich sediment; humus; apatite; zeolite; iron ore-rich material; organic shale; lime; gypsum; elemental sulfur; bauxite; fish meal; zerovalent iron, and/or oxides or hydroxyoxides of iron, manganese and/or aluminum; and mixtures of any two or more of the foregoing. The reactive solid material may be leonardite, lignite, or a combination thereof. The reactive solid material may comprise about 98 wt.% to about 99.5 wt.% of the dry weight of the compacted particles.

Once the reactive, compacted capping particles are dispersed in place over the contaminants, other inert holding materials, such as a second layer or gravel layer may be positioned thereover, if necessary, to prevent migration of the reactive materials when in an area of strong currents. For example, a composite chemical isolation layer specifically comprising a relatively discrete bottom layer of active capping product overlain by a relatively discrete layer of sand could be created by first mixing dry masses of the compressed particles with dry masses of sand prior to placement. Because of their larger size, the compressed product particles will naturally settle through the water column at a faster rate than the smaller sand particles. This differential settling rate, as a function of capping material type, will naturally result in first the deposition of the compressed product particles across the target contaminant surface, followed by deposition of sand particles over the compressed solid product particles. This method for product use would result in the relatively cost-effective construction of a composite active capping layer.

Further to the controlled, differential-settling-rate concept described in the preceding paragraph, two separate, discrete active capping layers, each containing a different type of reactive material, may be similarly created by including the different reactive materials in particles of variable size and/or variable specific gravity. For example, reactive material "A" (e.g. organoclay) may be incorporated into larger, more-dense particles while reactive material "B" (e.g. activated carbon) is incorporated into smaller, less-dense particles. Masses of the two types of particles could first be mixed together, then placed as a single mass through the water column. The particles containing reactive material A would naturally settle (and deposit) at a faster rate than material B particles, thus allowing for the relatively cost-effective construction of an active capping bi-layer design. Additionally, yet a third material capping component—e.g. an inert sand, of even a less-dense and/or smaller particle size—could also be added with masses of material A and material B particles, thus allowing for the relatively cost-effective construction of the active capping bi-layer with a separate, discrete third layer of sand deposited over the bi-layer.

In order to maximize the deposition of reactive material, it has been found that the compacted particles should have a particle size of at least about 3 mm and a specific gravity greater than 1.0, preferably at least about 1.5, more preferably at least about 1.8. Upon settling into position on the waterway bottom, over the contaminated soil, the compacted particles undergo at least a partial, rapid destruction of the compacted structure and form as a result of water penetration into the compacted particles and action of the wetted dispersant that is homogeneously distributed throughout each compacted particle.

Suitable dispersants include acrylic copolymers; biopolymers such as guar gum, xanthan gum, welan gum, cellulose, polysaccharides, starch, lactic acid polyesters, citric acid/sodium bicarbonate, soy protein and the like, and combinations thereof, or any dispersant that will provide for the de-compaction or de-aggregation of the compacted particles when submerged in water. Other suitable water-soluble dispersing agents include lignosulfonate, amines, and water-soluble acrylates, polyvinyl alcohol, and polyethylene glycol. Preferably the dispersing agent is a biopolymer, such as guar gum and/or xanthan gum, in an amount of about 0.5 wt. % to about 2 wt. %, based on the day weight of the compacted particles.

Compaction Method

It has been found that compaction pressures of at least about 150 psig, preferably at least about 300 psig, should be used in the manufacture of the compacted particles in order to ensure minimal attrition during transport, installation and handling. This compaction pressure also provides particles that sink directly through a water column without significant influence by current and tides so that placement is accurately onto a contaminated area. The compaction pressure may be in the range of about 150 psig to about 2000 psig. The compaction pressure may be in the range of about 150 psig to about 500 psig. It has been shown that the addition of an environmentally neutral dispersion aid provides rapid disintegration of the compacted particles for separation into smaller pieces, thereby substantially increasing the surface area of the reactive particles for better sorptive capacity and contact with the contaminants dispersed thereunder.

What is claimed is:

1. A sub-aqueous capping material comprising a plurality of compacted particles of a reactive solid material comprising a dispersion aid homogeneously blended therein, the compacted particles having a specific gravity greater than 1.0, and a particle size in the range of about 1/16 inch to about 1 inch;
   wherein the reactive solid material is selected from the group consisting of leonardite; lignite; organoclay; activated carbon; coke; organic-rich topsoil; organic-rich sediment; humus; apatite; zeolite; iron ore-rich material; organic shale; lime; gypsum; elemental sulfur; bauxite; fish meal; zero-valent iron, and/or oxides or hydroxyoxides of iron, manganese and/or aluminum; and mixtures of any two or more of the foregoing;
   and
   wherein the dispersion aid:
     is citric acid and sodium bicarbonate in combination;
     or
     is selected from the group consisting of lactic acid polyesters, amines, water- soluble acrylates, polyvinyl alcohol, polyethylene glycol, and combinations thereof;
     or
     is citric acid and sodium bicarbonate in combination and one or more materials selected from the group consisting of lactic acid polyesters, amines, water-soluble acrylates, polyvinyl alcohol, polyethylene glycol, and combinations thereof.

2. The capping material of claim 1, wherein the reactive solid material is selected from the group consisting of organoclay; activated carbon; and mixtures of the foregoing.

3. The capping material of claim 1, wherein the reactive solid material comprises about 98 wt. % to about 99.5 wt. % of the dry weight of the compacted particles, and the dispersion aid comprises about 0.5 wt. % to about 2.0 wt. % of the dry weight of the compacted particles.

4. The capping material of claim 1, wherein the dispersion aid is selected from the group consisting of lactic acid polyesters, polyvinyl alcohol, polyethylene glycol, and combinations thereof.

5. A method of manufacturing compacted particles that are structurally stable during transportation, handling and installation and disintegrate into smaller particles when submerged in a location covering contaminants in a waterway bottom material comprising compacting a plurality of solid reactive smaller particles having a particle size of about 0.1 mm to about 2 mm, and a dispersion aid homogeneously mixed with said smaller particles, using a compaction pressure of at least about 150 psig, to form the compacted particles having a particle size in the range of about 1/16 inch to about 1 inch;
   wherein the reactive solid material is selected from the group consisting of leonardite; lignite; organoclay; activated carbon; coke; organic-rich topsoil; organic-rich sediment; humus; apatite; zeolite; iron ore-rich material; organic shale; lime; gypsum; elemental sulfur; bauxite; fish meal; zero-valent iron, and/or oxides or hydroxyoxides of iron, manganese and/or aluminum; and mixtures of any two or more of the foregoing;
   and
   wherein the dispersion aid:
     is citric acid and sodium bicarbonate in combination;
     or
     is selected from the group consisting of lactic acid polyesters, amines, water-soluble acrylates, polyvinyl alcohol, polyethylene glycol, and combinations thereof;
     or
     is citric acid and sodium bicarbonate in combination and one or more materials selected from the group consisting of lactic acid polyesters, amines, water-soluble acrylates, polyvinyl alcohol, polyethylene glycol, and combinations thereof.

6. The method of claim 5, wherein the reactive solid material is selected from the group consisting of organoclay; activated carbon; coke; and mixtures of the foregoing.

7. The method of claim 5, wherein the reactive solid material comprises about 98 wt. % to about 99.5 wt. % of the dry weight of the compacted particles, and the dispersion aid comprises about 0.5 wt. % to about 2.0 wt. % of the dry weight of the compacted particles.

8. The method of claim 5, wherein the dispersion aid is selected from the group consisting of lactic acid polyesters, polyvinyl alcohol, polyethylene glycol, and combinations thereof.

9. The method of claim 5, wherein the compaction pressure is in the range of about 150 psig to about 2000 psig.

10. The method of claim 5, wherein the compaction pressure is in the range of about 150 psig to about 500 psig.

11. A method of capping a sub-aqueous contaminant contained on a floor of a contaminated waterway bottom material comprising directing the capping material comprising the plurality of the reactive compacted particles of claim 1 into water that overlies the contaminant such that the compacted particles descend through the water and cover at least a portion of the contaminated waterway bottom material in a thickness of at least one monolayer of the compacted particles.

12. The method of claim 11, further comprising adding an inert layer of sand over the layer of reactive particles.

13. The method of claim 11, wherein the reactive solid material is leonardite, lignite, or a combination thereof.

14. The method of claim 11, wherein the reactive solid material comprises about 98 wt. % to about 99.5 wt. % of the dry weight of the compacted particles, and the dispersion aid comprises about 0.5 wt. % to about 2.0 wt. % of the dry weight of the compacted particles.

15. The method of claim 11, wherein the dispersion aid is selected from the group consisting of lactic acid polyesters, polyvinyl alcohol, polyethylene glycol, and combinations thereof.

* * * * *

UNITED STATES PATENT AND TRADEMARK OFFICE
CERTIFICATE OF CORRECTION

PATENT NO. : 9,676,013 B2
APPLICATION NO. : 14/222146
DATED : June 13, 2017
INVENTOR(S) : Robert J. Trauger et al.

Page 1 of 1

It is certified that error appears in the above-identified patent and that said Letters Patent is hereby corrected as shown below:

In the Claims

Column 6, Line 22, delete the text beginning with "6. The method of claim 5," to and ending "of the foregoing." in Column 6, Line 24, and insert the following claim:

--6. The method of claim 5, wherein the reactive solid material is selected from the group consisting of organoclay; activated carbon; and mixtures of the foregoing.--

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*